US009384562B2

(12) United States Patent
Konnola et al.

(10) Patent No.: US 9,384,562 B2
(45) Date of Patent: Jul. 5, 2016

(54) METHODS FOR VISUAL CONTENT PROCESSING, AND SYSTEMS AND COMPUTER PROGRAM CODES THERETO (71) Applicant: Documill Oy, Espoo (FI)

(72) Inventors: Mika Konnola, Espoo (FI); Rami Hanninen, Espoo (FI); Terho Laakso, Espoo (FI)

(73) Assignee: DOCUMILL OY, Espoo (FI)

(*) Notice: Subject to any disclaimer, the term of this patent is extended or adjusted under 35 U.S.C. 154(b) by 45 days.

(21) Appl. No.: 13/752,513

(22) Filed: Jan. 29, 2013

(65) Prior Publication Data
US 2014/0212057 A1 Jul. 31, 2014

(51) Int. Cl.
G06K 9/36 (2006.01)
G06T 9/00 (2006.01)
H04N 19/12 (2014.01)
H04N 19/136 (2014.01)
H04N 19/17 (2014.01)
H04N 19/187 (2014.01)
H04N 19/27 (2014.01)
H04N 19/436 (2014.01)

(52) U.S. Cl.
CPC *G06T 9/00* (2013.01); *H04N 19/12* (2014.11); *H04N 19/136* (2014.11); *H04N 19/17* (2014.11); *H04N 19/187* (2014.11); *H04N 19/27* (2014.11); *H04N 19/436* (2014.11)

(58) Field of Classification Search
CPC ............ G06T 9/00; G06T 7/0081; G06T 2207/30176; H04N 19/00078; H04N 19/00127; H04N 19/00139; H04N 19/0026; H04N 19/00278; H04N 19/00321

USPC .................. 382/173, 233, 232, 220, 213
See application file for complete search history.

(56) References Cited

U.S. PATENT DOCUMENTS

| | | | | |
|---|---|---|---|---|
| 5,970,216 A * | 10/1999 | Tanio et al. | | 358/1.13 |
| 6,735,341 B1 * | 5/2004 | Horie et al. | | 382/239 |
| 7,600,183 B2 * | 10/2009 | Stern | | G06F 17/211 382/171 |
| 8,050,498 B2 * | 11/2011 | Wilensky et al. | | 382/173 |
| 2007/0050729 A1 * | 3/2007 | Kawamura | | H04N 7/147 715/781 |
| 2008/0050023 A1 * | 2/2008 | Feng | | H04N 1/41 382/232 |
| 2008/0137124 A1 * | 6/2008 | Butterfield | | H04N 1/00002 358/1.14 |
| 2010/0014116 A1 * | 1/2010 | Haruta | | B41J 2/471 358/1.15 |
| 2010/0290704 A1 * | 11/2010 | Christiansen | | 382/173 |
| 2012/0039535 A1 * | 2/2012 | Wilensky | | G06T 7/0083 382/173 |

* cited by examiner

*Primary Examiner* — Mekonen Bekele
(74) *Attorney, Agent, or Firm* — Young & Thompson (57) ABSTRACT Computer implemented methods, systems and computer program codes for creating visual content to be output. The methods and systems are applicable in content visualizations wherein the content to be output is to be formed in a layered manner. According to the method image content item or items are received and are categorized on a basis of content type to one or more categories. The image content item or items in the category or categories are rendered into one or more raster canvases, which represent image content data in the category. The image content data from the raster canvases are compressed, wherein the compression method for image content data in each of the raster canvases is selected on a basis of the categorization of image content items rendered in the raster canvas. The compressed image content data from the raster canvas is stored in a memory for further actions.

31 Claims, 6 Drawing Sheets

METHODS FOR VISUAL CONTENT PROCESSING, AND SYSTEMS AND COMPUTER PROGRAM CODES THERETO

TECHNICAL FIELD

The invention concerns in general the technical field of computer graphics. Especially the invention concerns manipulation of graphical data.

BACKGROUND OF THE INVENTION

The digitalization of information has resulted in a development of ways for storing and visualizing graphical information. The storing and visualization of graphical information i.e. images in a two dimensional space is based on two main types of graphical information, the first of which is called vector graphics and the second of which is called raster graphics (also known as bitmap).

The vector graphics is a type of computer graphics, which is based on an idea in which objects are tied into coordinates. The objects are for example lines, polygons, circles and other geometrical shapes. The characteristics and shapes of the objects are described as coordinates and mathematical expressions, such as mathematical formulas. For example, if a circle is to be created with vector graphics, an indication that a circle is to be created is needed, a location of the center of the circle in a coordinate system is defined as well as the radius of the circle. Additionally, the line style and a color and a fill style and a color are to be defined in the formula. By modifying the values in the formula the object can be re-shaped. Images based on the vector graphics are well-suited for showing ordered, exact and constructed items like text and diagrams. The images expressed with the means of vector graphics are called vector images.

In the raster graphics, in turn, the graphical information is expressed as a regular grid of colored points. More specifically, the raster image is composed from picture elements i.e. pixels, which are arranged in a grid structure, which is typically a rectangle. Each picture element has a predefined location in the grid and the color of the picture element is defined with color values. A raster image expressed as an array of data where each point occupies one array element is called an uncompressed raster image. The main benefit of this representation is that each point in the raster can be directly accessed by accessing the corresponding array element. The main drawback is that when that array is stored or transferred, the amount of raw data to be handled may be too much for the corresponding medium. The manipulation of the raster graphics image is possible in multiple ways, e.g. by adding or removing the picture elements to or from the image or optimizing the characteristics of the picture elements according to the needs. By means of the manipulation it is possible to affect the size of the image i.e. how much memory space is needed in storing the image data. Generally speaking, raster images are well-suited for showing disordered, approximate, and natural items like landscapes and physical objects typically originating from photos or scans.

In the context of raster images the density of the raster grid points is measured with resolution. The resolution indicates how many points can fit inside given area or along given line. Resolution is typically expressed as dots-per-inch (dpi), which literally tells how many points can fit on a line one inch long. The resolution is an important issue as regards to the manipulation and visualization of digital images in the raster graphics. Depending on the need the resolution may be increased or decreased. However, the resolution is not an issue in vector graphics due to the fact that as the content is expressed with mathematical formulas, the change of resolution does not have any effect on the image objects. Thus, vector images are often called as resolution independent images. On the contrary, the change of resolution in raster images significantly affects to the visual quality of the images, as already explained. Raster images are often called as resolution dependent images.

Both image types are used in storing and visualizing of graphical information. The vast majority of modern display devices are so called raster displays that show a regular grid of colored points. Although the arrangement and shape of these points vary, the concepts of density and resolution that apply to raster images apply directly to raster display devices, too. Raster displays can display both vector and raster graphics, but the process required doing so is different. The process of displaying vector graphics on a raster display is called scan line conversion. It resolves where freeform vector graphic shapes intersect with raster display points arranged into straight lines, and what the color at each such intersection point is. The process of displaying raster graphics on a raster display is called raster resampling. It resolves which colors to apply on each raster display point by interpolating the colors between the colors at neighboring raster image points. An important resampling special case is when raster image and raster display resolution and point arrangement match perfectly. Resampling operation is then reduced to a simple copying operation.

In order to display any visual content on screens of computing devices, or to store it into a bitmap image file, the content goes thru scan line conversion (vector graphics) or raster resampling (raster graphics) steps, as disclosed above. These steps transform visual content so that they can be rasterized into the raster canvas having a certain pixel density (resolution). With the term 'raster canvas' it is meant a raster image kept and maintained in uncompressed form in a memory of a computing unit, such as a computer. The visual contents in the raster canvas can then be displayed on screen, or stored into a bitmap image file. When storing the data into some memory structure or a file, different data compression schemes may be applied to optimize the resulting bitmap image file size. There are various ways to compress bitmap data, and thus influence quality/size ratio of the resulting bitmap image file. It is often desirable to minimize the image file size, just to make it more affordable and practical to store, or to transmit to some remote device. The time it takes to transmit a file is dependent on the file size, and in slow network connections like mobile networks, this has direct impact on the overall user experience—how long the user needs to wait in order to see a certain image file.

There are various compression methods available in order to compress image data to meet the needs of transferring and storing information. The compression methods can be divided into two categories. The first category covers so called lossless data compression methods, used in popular bitmap file formats like PNG and TIFF. Lossless compression methods seek to preserve data as it is, and in case of diverse, colorful image content the resulting image file size is often quite big. Thus prior using lossless compression methods it is often practical to apply pre-processing steps in order to optimize image data. This happens by for example reducing the number of colors used in the image (quantizing color map) or by getting rid of some details by reducing the image resolution. If these pre-processing steps are done appropriately, such pre-processing steps can be almost unnoticeable to the human eye. Generally speaking, lossless compression tends to work better with images which use limited number of colors, and contain large solid color areas.

The second compression method category covers so called lossy data compression methods, used in such bitmap file format as JPEG. Lossy compression methods, which are often used for compressing colorful, digitized images like photos or scans. In such cases lossy compression algorithms offer ways to balance image quality with resulting bitmap image file size. With high compression ratio lossy compression algorithms introduce various compression artifacts into the output image. These are especially visible in solid color areas, and also near areas which contain high contrast changes between nearby colors. Therefore, in case the image contains small details to be preserved, only low compression ratios can be used with lossy compression algorithms. Otherwise lossy compression will result losing some details, introduce visible compression artifacts, and significant loss of overall image quality observed. Compression artifacts typically smudge areas that should be uniformly and smoothly colored, and blur edges and fine details of small items. This often significantly affects printed text because letters and other symbols are typically uniformly colored and consists of many sharp edges and other fine details. Lossy compression methods, although more effective in reducing the amount of data required to express the images, are therefore not well-suited for compressing raster images containing line drawings and text. Photo raster images typically contain less uniformly colored areas or sharp edges; therefore they are far less in danger of being affected by compression artifacts. Lossy compression methods are therefore well suited for compressing photos and similar.

As can be concluded from the description above, in order to maintain the visual quality of a raster image, the compression method to be applied is to be chosen at least partly in accordance with types of content rendered into the raster canvas. For example, if a lossy compression method is heavily applied for textual content, the compression affects to the sharpness and clarity, and thus reducing the readability of the textual content. Similarly, if a lossless compression method is applied for example to a color photo, the resulting file size remains large due to the amount of details preserved. In fact, with photos there may not be any specific need for such detailed presentation. The challenge arises if the image into which compression is to be applied contains different kinds of rasterized content, originating from different source types. For example, the image may consist of color photo, vector graphics elements and rendered text. If a compression method, selected from either of the compression method categories as described, is applied to such diverse image content, the end result is not optimal. Either the visual quality drops to an unacceptable level or the image file size remains too large to be practical for storing and transferring purposes.

The challenge as described above is often present when the content in the raster canvas is very diverse, for example consisting of color photos, vector drawings and rendered text. This happens because prior saving the contents of the raster canvas into the raster image file, a compression method is applied over the entire raster canvas area. While both lossy and lossless compression approaches have their pros and cons, the diverse visual content often found in typical document pages represent the kind of content which is extremely difficult to compress well while maintaining desired visual quality, observed as text readability, image quality, sharpness and preservation of details.

A specifically challenging occasion for the above described situation is when a document with both vector and raster content gets paginated, i.e. the content is divided into one or more discrete pages and the content in resulting document pages is converted into raster image form for convenient storage, transfer and display.

SUMMARY

An objective of the invention is to present methods, systems and computer program codes stored in computer readable medium for manipulating graphical data. Another objective of the invention is that the methods, the systems and the computer program codes stored in computer readable medium provide tools for creating visual content in order to be displayed.

The objects of the invention are reached by methods, systems and computer program codes stored in computer readable medium as defined by the respective independent claims.

Various examples of methods and systems for creating visual content to be displayed are described.

According to a first aspect, a computer implemented method for creating visual content to be output in a layered manner is provided. The method comprises steps of receiving at least two image content items, categorizing the received image content items on a basis of content type to at least two categories, rendering the image content items in each of the at least two categories into corresponding number of raster canvases, each raster canvas representing image content data in one category, compressing the image content data in each of the raster canvases, where-in the compression method for each of the raster canvases is selected on a basis of the image content data in the raster canvas to be compressed, and storing the compressed image content data of each of the raster canvases.

The method may further comprise a step of outputting the stored image content data of each of the raster canvases into one of the following: a display device, a printer, a communication channel. The method may also comprise a step of storing the rendered image content items as a raw data and performing post-processing to such rendered image content data prior to the compression.

The categorizing may be performed on a basis of analyzing the received image content items. Alternatively or in addition, the categorizing may be performed by detecting an identifier indicating the type of the received image content item.

The method may also comprise a step of determining a position of the image content data in each of the raster canvases with respect to each other when image content data in at least one raster canvas has different physical dimensions than the image content data in at least one other raster canvas. The positioning of image content data in the raster canvases with respect to each other may be achieved by means of determining at least two reference points in image content data of a raster canvas covering the largest area of the area to be displayed, wherein the at least two reference points are configured to be utilized in positioning image content data of at least one other raster canvas with respect to the image content data of the raster canvas with the reference points. Alternatively or in addition, the positioning of the image content data of the raster canvases may be determined by defining the position of the image content data in each of the raster canvases with respect to a common coordinate system.

According to the first aspect of the invention the compression method for the image content data in each of the raster canvases may be different or the same. Alternatively, the compression method for the image content data in each of the raster canvases may be the same with different parameters used within the compression method.

Furthermore, the image content data in each of the raster canvases may comprise an indicator indicating at least one of the following: the image content data of the raster canvases belonging to the same visual output to be displayed, an order of the image content data of the raster canvases with respect to each other in the visual content to be displayed in a layered manner, positional information of the image content data of the raster canvas when displayed. The indicator may be established in at least one of the following manner: in a file name of a file where compressed image content data from a raster canvas is stored, in a metadata of a file storing compressed image content data of a raster canvas, in a separate file maintaining instructions for displaying the visual content.

According to a second aspect, a system for creating visual content to be output in a layered manner is provided. The system comprises one or more processors, a memory including computer program code, and the memory and the computer program code configured to, with the processor, cause the system at least to perform the following: receive at least two image content items, categorize the received image content items on a basis of content type to at least two categories, render the image content items in each of the at least two categories into corresponding number of raster canvases, each raster canvas representing image content data in one category, compress the image content data in each of the raster canvases, wherein the compression method for each of the raster canvases is selected on a basis of the image content data in the raster canvas to be compressed, storing into the memory the compressed image content data of each of the raster canvases.

The system may further be configured to output the stored image content data of each of the raster canvases into one of the following: a display device, a printer, a communication channel. The system may also be configured to store the rendered image content items as a raw data and to perform post-processing to such rendered image content data prior to the compression.

The system may be configured to categorize the received image content items on a basis of analyzing the received image content items. Alternatively or in addition, the system may be configured to categorize the received image content items by detecting an identifier indicating the type of the received image content item.

The system may further be configured to determine a position of the image content data in each of the raster canvases with respect to each other when image content data in at least one raster canvas has different physical dimensions than the image content data in at least one other raster canvas. The system may be configured to determine at least two reference points in the image content data of a raster canvas covering the largest area of the area to be displayed, the at least two reference points are configured to be utilized in positioning image content data of at least one other raster canvas with respect to the image content data of the raster canvas with the reference points. Alternatively or in addition, the system may be configured to determine the positions of the image content data of the raster canvases by defining the position of the image content data in each of the raster canvases with respect to a common coordinate system.

According to a third aspect, a computer implemented method for creating visual content to be output is provided. The method comprises steps of receiving one or more image content items, categorizing the received one or more image content items on a basis of content type to a category, rendering the one or more image content items in the category into a raster canvas, the raster canvas representing image content data in the category, compressing the image content data in the raster canvas, wherein the compression method for the raster canvas is selected on a basis of the image content data in the raster canvas to be compressed, storing the compressed image content data of the raster canvas.

The method may further comprise a step of outputting the stored image content data of the raster canvas into one of the following: a display device, a printer, a communication channel. The method may also comprise a step of storing the rendered the image content item as a raw data and performing post-processing to such rendered image content data prior to the compression.

The categorizing may be performed on a basis of at least one of the following: analyzing the received image content item, detecting an identifier indicating the type of the received image content item.

According to a fourth aspect, a system for creating visual content to be output is provided. The system comprises one or more processors, a memory including computer program code, and the memory and the computer program code configured to, with the processor, cause the system at least to perform the following: receive one or more image content items, categorize the received one or more image content items on a basis of content type to a category, render the one or more image content items in the category into a raster canvas, the raster canvas representing image content data in the category, compress the image content data in the raster canvas, wherein the compression method for the raster canvas is selected on a basis of the image content data in the raster canvas to be compressed, and store the compressed image content data of the raster canvas.

The system may further be configured to output the stored image content data of the raster canvas into one of the following: a display device, a printer, a communication channel. The system may also be configured to store the rendered the image content item as a raw data and to perform post-processing to such rendered image content data prior to the compression.

In addition, the system may further be configured to categorize the image content item on a basis of at least one of the following: analyzing the received image content item, detecting an identifier indicating the type of the received image content item.

According to fifth aspect, a computer-readable storage medium storing portions of computer program code is provided, wherein the portions of computer program code are computer-executable to implement the method for creating visual content to be output in a layered manner as described.

According to a sixth aspect, a computer-readable storage medium storing portions of computer program code, wherein the portions of computer program code are computer-executable to implement the method for creating visual content to be output as described.

The exemplary embodiments of the invention presented in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from

DETAILED DESCRIPTION

Figure 1:
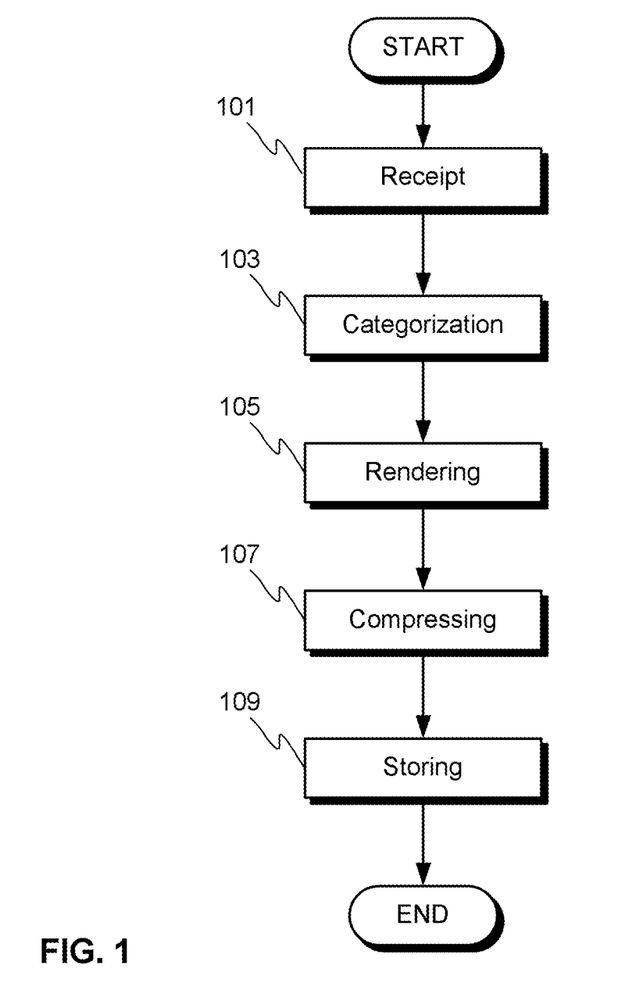
FIG. 1 illustrates an example of the method according to the invention.

The idea of the content manipulation engine according to an example of the invention is illustrated in FIG. 1. In the computer implemented method image content items are received 101 in a processing entity. The image content item refers here to any graphical data object, such as an image, a text, or similar, which is configured to be included in the final graphical image with necessary manipulation to the data. The receipt of image content items covers also any retrieval of the data. The image content items may be received in a file format or in a data stream. The received image content items may be categorized 103 on a basis of content type to at least two different categories. The categorized image content items may be rendered 105 into at least two separate pre-determined raster canvases. The concept of at least two separate pre-determined raster canvases refer to an idea that there are a pre-agreed number of raster canvases into which the received and categorized image content items may be rendered. In the next phase 107, a first compression method 107 is configured to be applied to the image content data in the first raster canvas and a second compression method is configured to be applied to the image content data in the at least one other raster canvas. The first and the second compression methods may differ from each other or be the same with different operational parameters. As a result of the compression phase 107, the compressed image content data from the first and the at least one other raster canvas are stored 109 in a memory structure. An indication is set that the compressed image content data from the first and at least one other raster canvas are configured to form the visual content to be outputted together in a layered manner. The example of the method according to the invention disclosed in FIG. 1 is a simplified presentation and the invention with different aspects thereto is discussed in more detail in the following. Even if above it is mainly referred to only two separate raster canvases, the number of raster canvases may also be any other than two.

In the categorization step 103 the image content to be manipulated may be categorized based on the type of the image content item. The type of the image content item is, according to an example of the invention, recognized in a predetermined manner. For example, the categorization step may comprise some predefined analysis to be performed to each image content item received. The image content item, such as some object to be placed on a page, may be a watermark image or other background graphics designed to be visualized under all other image content items. Based on that, such an image content item may be configured to be interpreted to belong to the bottommost layer in the final layered visual output. On the other hand, any textual content item, in most cases, may be configured to be inserted in the topmost layer i.e. on a layer above all the other layers from the viewing angle. Also, any other basis for the categorization can be used than the analysis of the image content item. In situations where a specific effect, such as intentional blurring or partial semi-transparent merging with some other content item, is to be applied to an image content item, such an effect is applied to the affected area of the page, and the resulting modified image content item may get stored in a different layer than similar content without such a special effect applied. This may require a deletion of the original image content item from the source layer in order to avoid any collision of the original image content item and the modified image content when outputting the visual content.

Alternatively or in addition, the image content item may include a predefined identifier, which indicates the type of the image content item. The identifier may be part of the name of the corresponding image content item, or alternatively or in addition into some header information if such a data structure exists in context of the image content item. The identifier may also be interpreted to indicate the layer into which the image content item in question is to be rendered. All the image content items in the same category form the image content data for the target raster canvas. The source of information with respect to the type of an image content item may vary. For example, the form of metadata in image content items varies a lot on a basis of the type of the image content item. For example, as regards to image content items of a type of bitmaps, the identifier as described may be found from the header information. On a contrary, in a case of textual image content items or vector graphics the metadata to be used as an identifier for the type of the content is stored in diverse ways.

Next, it is introduced some further possibilities as an examples of the invention how the image content items may be categorized in an appropriate way and thus to be able to apply the most appropriate manipulation scheme for each image content item. The categorization of each image content item may be done on a basis of its type. For example, the type of the image content item may be at least one of the following: background (image, vectors which typically belongs to the bottommost layer), textual content (which usually goes to the topmost layer), bitmap/vector images (which for some reason must be treated differently than background content for example for sharpness or quality reason—they may be above or below the textual content or visual content where some specific effect is to be applied and this may be needed for mixing different types of image content items together). Such image content item may become part of the background, or perhaps be rendered into a separate content layer much like some image/vector objects on that page. Furthermore, the categorization may be performed on a basis of storage object type/format: bitmap images vs. vector data, or bitmap fonts vs. vector fonts, or even on a basis of an amount of information of the image content item. The resolution of the image content item, such as a bitmap image, may be one measure for the categorization. In order to achieve the final layered visual output the categories may have an unambiguous priority order with respect to each other which is used for determining the stacking order of the image layers. Each image layer contains image content data captured from a certain raster canvas where all the image content items belonging to the same category have been rendered. All image content items belonging to the same category are defined to be image content data of a certain image layer.

It is worthwhile to mention that the invention itself does not anyhow limit how the image content items are categorized as long as it is possible to implement the categorization of the image content items. For example, it is possible that the image content items in the first image content data are the same type to the image content items in the second image content data. In such a case the first and second image content data shall be categorized on a basis of some predetermined criteria, such as an indication in the name of the raster canvases, for example.

In step 105 the image content items in each category are rendered by the system. This means that the image content items in each category is prepared for the output of the graphical information in such a manner that the image content data formed from the one or more image content items belonging to the same category can be output in a layered manner so that the desired content from each of the raster canvases can be made visible. In other words, all image content items belonging to the same category are defined to be image content data of a certain image layer. Thus, the image content data gets rendered into a designated raster canvas for the final layered visual output. For the reason of the layered presentation the rendering of a single image content item may also mean that some picture elements in multiple raster canvases, i.e. the raster images kept and manipulated in uncompressed form in the memory of a system, are modified. The modification may comprise e.g. that the value of some picture elements of one or more raster canvases are set to zero implying that the modified picture elements are transparent or that the value of some picture elements is set to some other in order to achieve the desired effect. The transparency in this context means that the picture elements are set to colorless value so that possible content in picture elements in other raster canvases residing below the raster canvas with transparent picture elements can be seen through the transparent picture elements. It shall be noted that the image content data in the raster canvases may be rendered in parallel or sequentially. In case of sequential rendering the number of picture elements of each raster canvas required to cover the union of all non-transparent picture elements of rendered image content items belonging to the corresponding category and target area may vary until all image content items has been rendered. Thus, one rendering operation of an image content item in a certain raster canvas may affect any number of other raster canvases of any priority i.e. the stacking order.

In some application of the invention the categorization and rendering may be consequential process steps. However, some applications may need that the categorization and the rendering are performed at least partly in a parallel manner, or iteratively. This may be the case when the rendering of an image content item comprises some specific effect. Such effects may e.g. be a merge, a mix, a blur, Boolean operators and/or partial transparency. In other words, the category of any image content item may depend not only on the content type of the image content item itself, but also on the content type of any other image content item that is configured to interact with that data element with e.g. any of the mentioned effect. On the basis of understanding the interaction with different image content items the image content may be categorized. As categorization may be performed sequentially to each image content item, the categorization of an earlier categorized image content item may change multiple times as new image content items that interact with image content items already categorized are processed.

An example of the above described situation may be that a first layer comprises textual content and a second layer comprises background image content item wherein the textual content item is to be layered on top of the background image content item. It may be that the textual content item may be defined to be at least partly transparent, which means that the displayed text comprises color changes according to the underlying background image content, caused by the partial visibility of the underlying image content through partial transparency of the textual content. In such a case the final text with color variations should be rendered into the same layer as where the background image content is, as its colorful nature and blending with non-solid background is better compressed, stored and displayed with photo-centric compression methods. Thus, the final text is preferably categorized to the same image data content as the background image item.

Summarizing the above, when rendering the categorized image content items it is important to take into an account how the image content items should interact with each other when rendered in a layered manner. According to some examples of the invention the image content data, which is resulting from the interaction of the image content items, may be associated to a certain image content layer, which may be configured to be background layer, or in some cases it may be arranged that a completely new layer is formed on the content, which is the result of the interaction. Thus, an iterative categorization may be needed in order to categorize the received image content items as well as any new items, which may be a result of any interaction between the image content items, into correct raster canvases.

An issue relating to rendition and creation of the final layered visual output from multiple layers of image content data is the positioning of the image layers with respect to each other. As the physical dimensions of the image content data area captured from different raster canvases may vary when the contents in the image layers are visualized, the correct positioning of the image layers is an important issue in order to achieve the desired layered visual output. The information on the physical dimensions of the image content data to be output in a layer may be one outcome of processes as described above, which information is configured to be forwarded to any further processes in the method according to an example of the invention. A straightforward approach is available when physical dimensions of the image content data in different layers to be stacked are the same. In such a case the rendering, and any other processes, may be performed without any additional remarks. The same applies when the image layers to be output are not the same size, but the image layers in the final layered visual output have the same height and width ratios. In that case the image layers may be matched by scaling the corresponding bitmap images into the same size with e.g. a bitmap scaling.

A further case may be that some of the image content data in raster canvases forming the different image layers in the final layered visual output are not the same physical size and they comprise different dimensions. Then, there is a need to determine some reference points by means of which the image layers can be positioned with respect to each other. The reference points may be determined with respect to the image layer which covers the largest area of the display area. Typically it is the image layer which is equal in size with the display area. Alternatively or in addition, the display area may form a coordinate system and the positions of the image layers are defined with respect to the coordinates system. According to both positioning mechanism as mentioned above a necessary number of coordinates (X, Y) are to be determined. Typically the number of coordinates needed for positioning is two. The coordinate information may be stored alongside with the image content data of each raster canvas, and utilized when the final layered visual output is created. Alternatively or in addition, the coordinate information may be inserted to a file name of the image content data or into the metadata of the file which is the outcome of the categorization and rendering processes. Such metadata may also be inserted in the image file header information, for example. Alternatively or in addition, one or more separate files may be formed, which comprises information on the image content data of different layers and/or their mutual relationship.

Above it is mainly discussed about the categorization and rendering operations, which may be processed either sequentially or at least partly in parallel with any necessary iterative steps to the image content items. The outcome of the mentioned processes may also be a data file for storing indicators on the stacking order of the image layers.

According to an example of the invention the image content data belonging to different image layers may be stored in such a manner that the image content data for a first image layer and image content data of any other image layer comprise identifiers for indicating that the image content data of the image layers belong to the same visual output, such as to an output image. In other words, there are arranged identifiers for indicating that the image layers are to be represented simultaneously in order to achieve the desired visual outcome in the final layered visual output. According to an example of the invention the identifier is arranged in the name of data file comprising the image content data of a certain image layer. The identifier may e.g. be a simple character string at the end of the file name. Furthermore, the identifier may comprise a specific indicator to disclose the stacking order of the different image layers in the final layered visual output. Again, this may be indicated with a character string. Alternatively or in addition, if the physical sizes of the different image layers vary as discussed earlier, the indicator may comprise coordinate information, which indicates the position into which the image layer in the final layered visual output is to be positioned in relation to the other image layers in the same final layered visual output. According to some other example of the invention the file types of the data files comprising image content data for a certain image layer may indicate the order of different layers in the final layered visual output. For example, it may be defined that e.g. data file type of JPEG is always set as the bottommost layer and e.g. data file type of PNG is the topmost layer. In case of more than two layers even more sophisticated rules for superposing the layers may be defined. According to still further example of the invention it may be arranged that a file size of image content for a layer determines the order of the layers. Alternatively or in addition, the mentioned pieces of information which may be needed in outputting the final image content in the layered representation may be stored to some metadata structure in a file comprising the image content data of a layer to be output. The pieces of information may also be stored in a separate file which is configured to maintain instructions for displaying the final layered visual output. The data files may be stored, either permanently or temporarily, in a data storage, such as in a memory of device system.

In some example of the invention the output data from categorization and rendering processes, which is e.g. stored at least temporarily in a memory buffer in a system, may be post-processed. The post-processing may be needed when there is aim or need to process further the image content data before any compression. Such a demand may arise if one need to e.g. reduce colors in the image content data and such an operation is beneficial to perform before the compression step. The advantage of the optional post-processing as described is that the image data content may be processed before compression and thus the size of the data may be minimized.

Step 107 comprises one or more compression operations to be performed for the rendered image content data in raster canvases. With the compression operation it is meant that one or more predetermined compression method is configured to be applied to the image content data in each of the raster canvases in order to compress the amount of information in the image content data in the raster canvases. A compression ratio is a measure used for representing the capability of the compression method to reduce the amount of information. According to one embodiment of the invention different compression methods are applied to the image content data in the different raster canvases. The compression methods may be selected according to the image content data, e.g. according to the type of the image content data. According to another embodiment of the invention the compression methods to be applied to the image content data in the different raster canvases are the same, but the compression is performed with different parameters defining the operation of the compression method. The parameters defining the operation of the compression method may relate to quality aspects of the operation. It may also be implemented in such a manner that the image content under compression is processed iteratively with multiple compression parameters and the most optimal output from these compression iterations is selected. According to still further embodiment of the invention it is possible to apply the same compression method with exactly the same operational parameters to the image content data of the different raster canvases. The advantage of such an implementation of the invention is that the total amount of output data of the compression operations for rendered image content data in different raster canvases may be smaller than the amount of output data in applying the same compression method to image content data of such a raster canvas into which the graphical information of the different layers were already combined. The reason is that the operational characteristics of the compression algorithms may, at least partly, be dependent on the homogeneity of the content to be compressed. Thus, according to the invention the compression methods to be applied to the image content data are to be selected at least partly on the basis of the content type rendered into a certain raster canvas in order to establish an efficient manipulation engine. Naturally, the need of the efficiency of the manipulation engine may vary a lot according to the need and application area of the invention.

A typical example of the compression methods to be used is that the first compression method is so called lossy compression method, such as JPEG, which is to be applied to the image content data in the first raster canvas which in this case is the raster canvas which is configured to be set as the bottommost raster canvas. Then, the compression method may e.g. be such that it does not support pixel transparency. The rendered image content data can be e.g. a colorful digital photo or a scanned image. The aim with the first compression method is that the size of the image content data in the first raster canvas can be reduced to meet requirements set for storage, for instance. Similarly, a second compression method may be so called lossless compression method, such as PNG, which is to be applied to the image content data in the second raster canvas. The second rendered image content data may be e.g. text or diagrams originating from vector graphics, for instance. Thus, the clarity of the second rendered image content data shall be maintained in the final graphical representation, which is composed from the first and the second raster canvases consisting of different types of content. Further, the compression method selected for the second rendered image content should support pixel transparency in order to visualize the content in the bottommost raster, or any lower layer, through the second layer. The support of pixel transparency means in practice that transparency information stored in pixel information is maintained in the compression. As a result, very heterogeneous visual content can be manipulated so that the characteristics of the contents can be maintained when visualizing the final output. As said the compression methods as well as the image content data types above are examples and may vary. For example, it is possible that lossy compression methods are applied to both raster canvases, but with different parameters. Furthermore, even if it is mainly discussed applying the invention in a case of two layers to be superposed, the invention is applicable in a situation, where more than two layers are to be superposed. The compression methods for each of the layers are determined at least partly on the basis of the image content data in that layer. Similarly, the transparency aspect of pixels on different layers is to be considered in order to achieve a desired visual outcome. The term compression shall be understood broadly. It shall cover any operations to the data which makes the image content data more compact and thus better suited for storage and transfer purposes.

The compressed image content data from the raster canvases is finally stored 109 either temporarily or permanently to a memory of the system in a file format, such as a bitmap data file.

The outputting of compressed image content data may be performed in multiple ways. The principle is that in the outputting stage the compressed image content data from different raster canvases is displayed or printed according to instructions as described above. During the output stage the compressed image content data originating from different canvases are first uncompressed, and then visualized on a display coupled either directly or indirectly to a system, which has received the compressed image content data from an entity that has performed the described image content data processing. The outputting of the image content data may be achieved by calling the output of information by application software residing and running in the system. The application software is configured to read the instructions as regards to displaying the final image. The application software is configured to read any instructions on a stacking order of the image layers, or any other instructions, in order to achieve the graphical visualization of the image content data. Alternatively or in addition, the application software is configured to recognize and read any instruction relating to positions of one or more image layers, with respect to each other. This is especially the case if at least one of the image layers differs in the physical size from any other. In addition to the above described examples of the application software it may also be arranged so that the application software comprises portion of computer program code which comprises information on files, which are to be downloaded and in which order the files comprising graphical information are to be displayed or printed, when stacked on top of each other.

In addition to the displaying of the image content data on a display it is possible that the content is printed out to a paper by a printer. Similarly, the application software controlling the printer device is configured to recognize any instructions stored in a relation to the image content data and the content is to be printed out according to the instructions.

Furthermore, the outputting of the image content data may comprise an operation in which the image content data is transmitted over a communication channel to any other entity, which is configured to displaying the image content data as a data stream.

Figure 2:
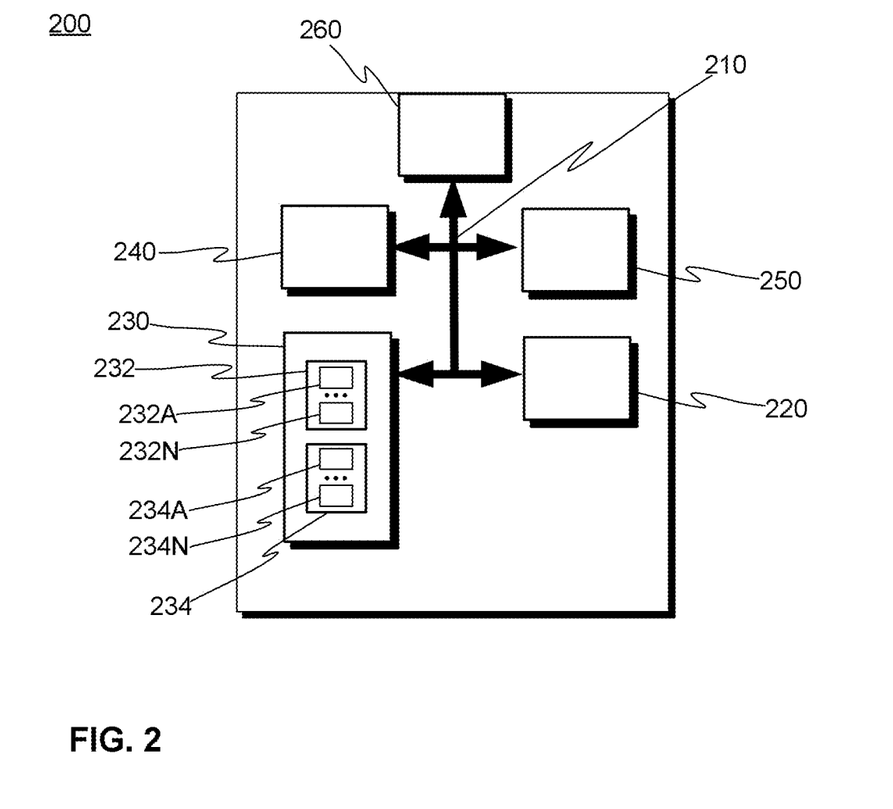
FIG. 2 illustrates an example of a system according to the invention.

The invention also relates to a system which is configured to implement the method as described above. A system according to an example of the invention is illustrated in FIG. 2. The system 200 comprises, for example, a bus 210, a processor 220, a memory 230, input means 240, output means 250, and a communication interface 260. The bus 210 may include means or methods that enable communication among the elements of the system 200. The system may comprise, or be implemented by, one or more servers, one or more desktop computers, one or more laptop computers, one or more tablet computers, one or more mobile communication terminals or one or more special hardware devices as long as it is capable of implementing the method according to the invention. Thus, in principle any computing device which comprises necessary hardware and computer program code stored in a memory, may be configured to implement the method as described.

The processor 220 may comprise one or more conventional processors, one or more microprocessors, or one or more processing logics, or any combination of these, that interprets and executes instructions defined by portions of computer program code. The memory 230 may comprise a random access memory (RAM) 232 and/or a read only memory (ROM) 234. The RAM 232 may store information and instructions in a form of portions of computer program code 232A-232N for execution by the processor 220. The ROM 234 may include a conventional ROM device or another type of a static storage device that is configured to store static information and instructions in a form of portions of computer program code 234A-234N for use by the processor 220. The RAM 232 and ROM 234 may be implemented with one or more corresponding memory elements.

The input means 240 may comprise a conventional mechanism that permits inputting information to the system 200, such as a keyboard, a mouse, a pen, a touch screen, voice recognition and/or biometric mechanisms, CD/DVD/Blueray drive etc. The output means 250 may comprise a conventional mechanism that outputs information, including a display, a printer, a speaker, etc. The input and output means are not necessarily implemented into the system 200, but may be coupled to the system 200 with some known interfaces either wirelessly or in a wired manner when needed. In some examples of the invention the system does not comprise any input means 240 or output means 250 as the system operates as a standalone entity, which is controlled externally through the communication interface 260.

The communication interface 260 may enable the system 200 to communicate with other elements and/or systems, such as networks, as well as with client terminals either directly or indirectly over a network.

The system 200 may perform the operations as described above in response to the processor 220 executing at least one instruction defined in portions of computer program code contained in the computer-readable medium, such as memory. A computer-readable medium may be defined as a physical or logical memory device. The software instructions may be read into the memory from another computer-readable medium, such as a data storage device, or from another device via the communication interface 260. The software instructions may cause the processor 220 to perform method steps and processes as described and thus to enable the operation of the system 200 according to an example of the invention.

As said, FIG. 2 illustrates an example of the system 200 according to the invention. The elements as disclosed in FIG. 2 do not necessarily exist in all implementations of the system 200. For example, the system 200 may not comprise input means 240 and output means 250, but the system 200 may be accessed through the communication interface 260 with applicable devices and systems. As well, the number and type of memories may vary. Further, the amount of portions of computer program code may depend on the implementation.

The system 200 is configured, by means of at least part of the mentioned elements, to implement the method according to an example of the invention. The system 200 may be any device that receives the image content data as an input through e.g. the communication interface 260, performs the described method steps and returns or forwards the processed image content data further.

Figure 3:
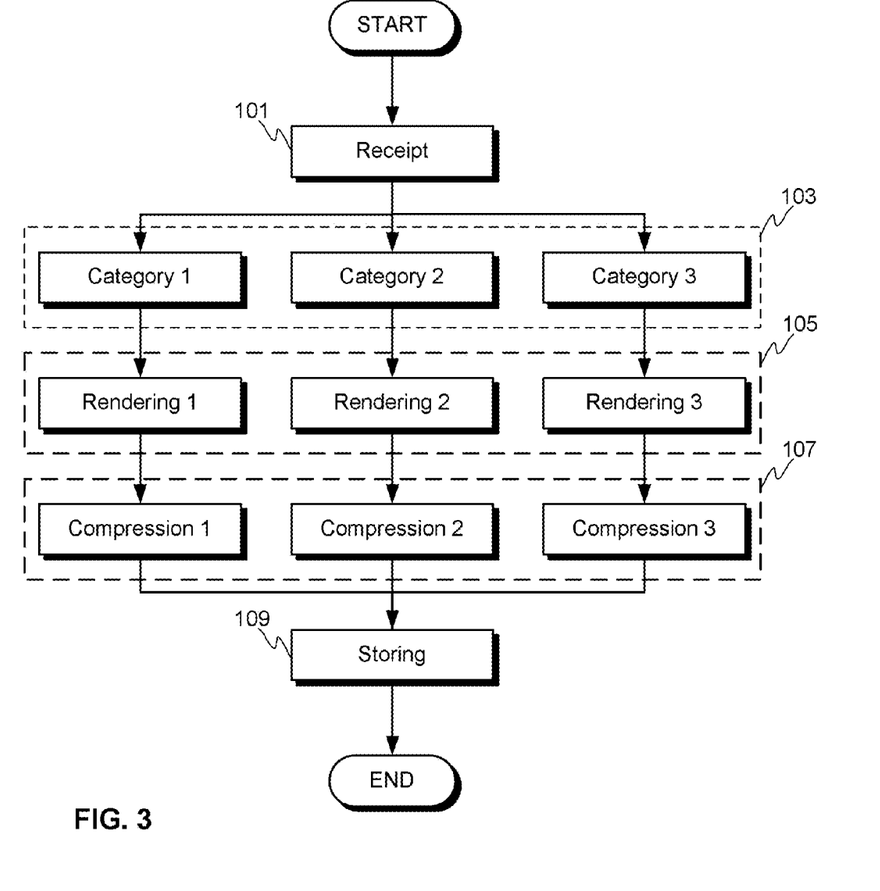
FIG. 3 illustrates an example of the invention in a specific environment.

FIG. 3 illustrates an example of the invention when the idea is applied in a case where three types of different image content items are received 101. The received image content items belong to the same final visual content representation i.e. a certain page of a certain document, and in order to reproduce the final visual output all of them need to be rendered. The received image content items are categorized 103 in different categories, which are there in this case (Category 1, Category 2, Category 3). The image content items in each of the mentioned categories are rendered 105 (Rendering 1, Rendering 2, Rendering 3). According to the example according to FIG. 3 for the rendered image content data in each of image layers a compression method (Compression 1, Compression 2, Compression 3) is to be applied 105. The compression method is selected at least partly on a basis of the type of the image content items in each category, and consequently the image content data rendered in each image layer. The compressed image content data is stored 109 in a memory of a system, which system may be a system 200. The storing may be performed so that the output data from each of the compressions are stored separately in the memory. According to some example of the invention the compressed image content data in different image layers, may be combined into a single image file, which is supported by e.g. TIFF format, for storing so that the final visual image content is stored and there is no need to any combination operation in the output device. Any other aspect of the method as described in the context of FIG. 1 may be applied here.

Figure 4:
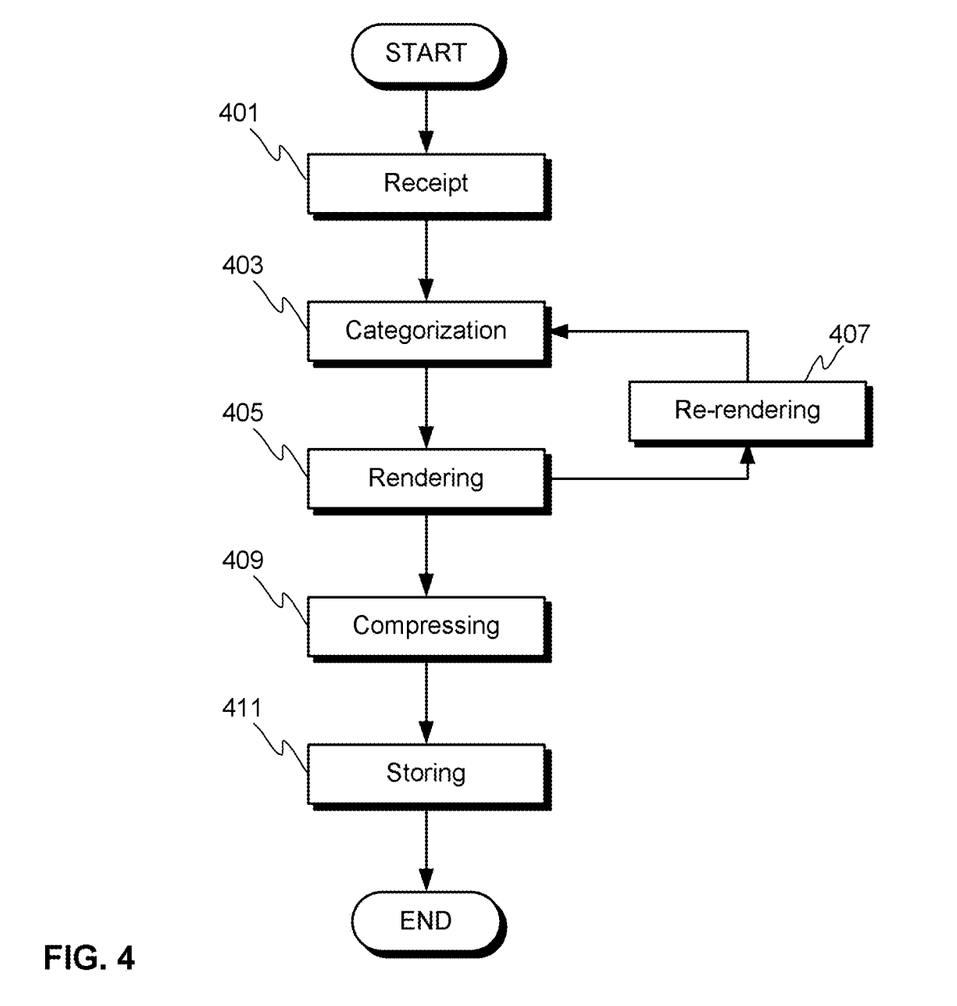
FIG. 4 illustrates a further example of the method according to the invention.
Figure 5:
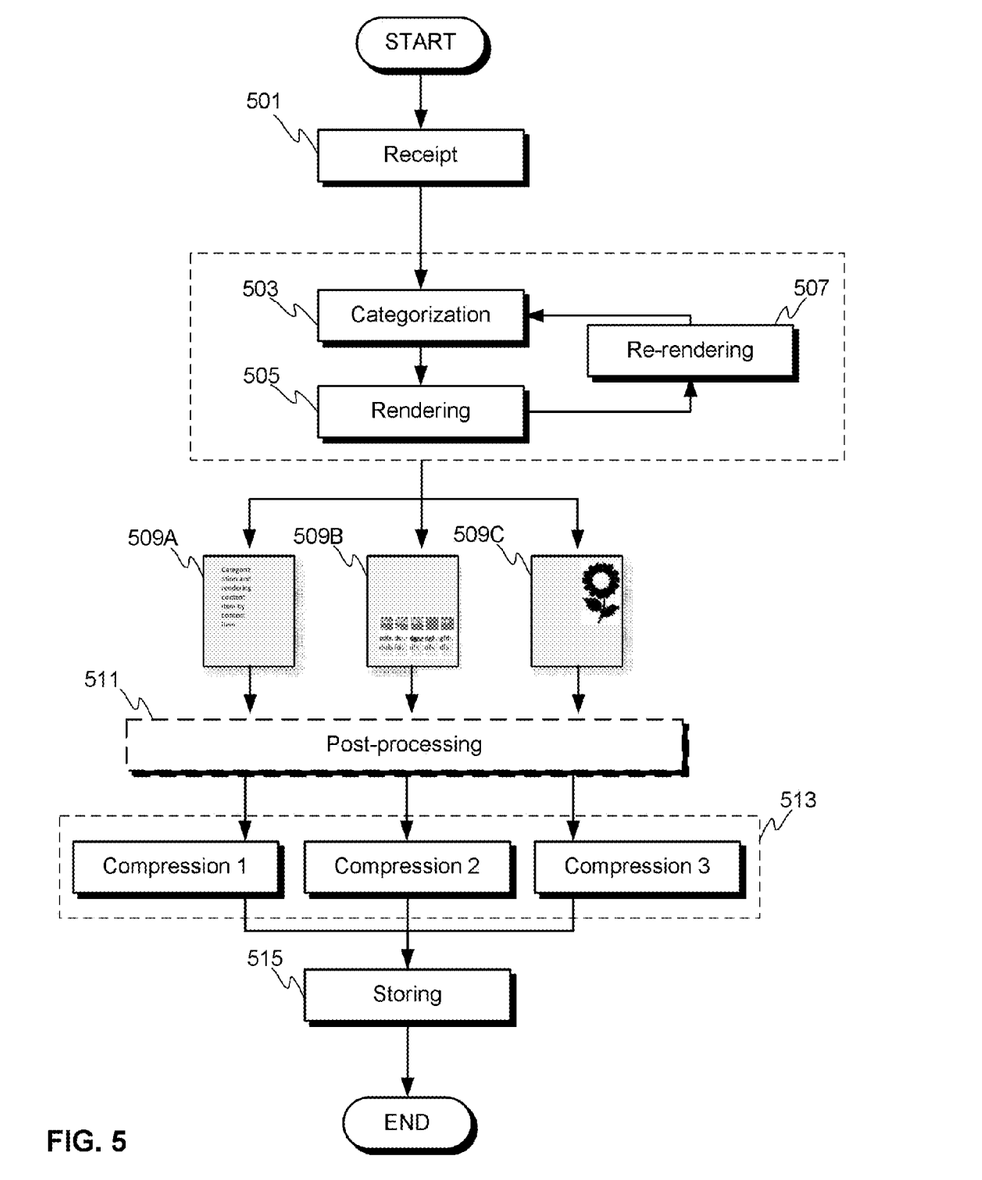
FIG. 5 illustrates a still further example of the method according to the invention.

FIGS. 4 and 5 illustrate some further aspects of the invention, which are at least partly discussed before in this document. FIG. 4 discloses an example of the invention in which image content items are received 401 as an input data. The input data can be in a file, in a data stream or stored in a memory, which is read by a system. The received image content items are configured to be categorized 403 by the system on a basis of the characteristics into different categories. Depending on the application area also other aspects may be taken into account in the categorization. For example, required visual presentation may be one aspect for the categorization and in such a case parameters such as fidelity and quality of the visual presentation may have effect on the categorization. Next, the categorized image content items may be rendered into corresponding raster canvases 405, i.e. in the order of presentation when outputted as the raster canvases are set to a predetermined order. In a case that rendering of the image content items is associated with a specific effect, such as blending or blurring, which effect gets at least part of the input data and/or parameters from some other already rendered image content item in one of the raster canvases, the rendering of the image content item in question may impact the already rendered image content data in one or more raster canvases. Thus, the already rendered image content item may be needed to re-rendered 407 together with the image content item and its effect. The outcome of the re-rendering is that the re-rendered image content items may be rendered into some other raster canvas than where they were originally rendered to. In addition to the re-rendering it may be required that the original rendered image content item is to be deleted from the original raster canvas in order to avoid any collision of the originally rendered image content item and the re-rendered image content item when outputting the visual content. When all the image content items, belonging to the same page, are rendered and re-rendered the result of the rendering process as a whole is stored as image content data in the corresponding raster canvases. The image content data is compressed 409 wherein the compression method and its parameters are selected on a basis of desired visual presentation quality and size aspects of the final visual output i.e. when the compressed image content data for the different image layers are placed on top of each other in the predetermined order. The outcome of the compression step 409 is compressed image content data, which is stored 411 into corresponding files, or it may even be streamed to a destination address. The storing of data, i.e. files, is configured to be performed in such a manner that information on the order of layers is maintained alongside or within the data files, e.g. in names of the data files or in metadata, for example.

FIG. 5, in turn, illustrates an example of the invention in such a manner, which clarifies the aspects of the invention. The image content items are received 501 in some manner in the system. The received image content items are categorized, 503, rendered 505 and re-rendered 507 as described. The outcomes of the categorization 503 and rendering 505 are several raster canvases 509A, 509B, 509C into which the categorized image content items are rendered. In FIG. 5 the outcomes are one raster canvas comprising textual image content items 509A, one raster canvas comprising vectors 509B like table borders and one raster canvas comprising background bitmap image 509C.

The number of raster canvases is dependent on the desired final visual representation i.e. how fine-grained the categorization needs to be in order to achieve the desired visual presentation. In the example of the method according to the invention as disclosed in FIG. 5 the optional post-processing step 511 is illustrated. The post-processing may be performed on the image content data in one or more raster canvases. The post-processing 511 may be e.g. color reduction by color quantization. In some implementation of the invention there is no need for the post-processing 511. In response to either categorization 503, rendering 505 and re-rendering steps 507 or post-processing 511 the image content data in the raster canvases 509A-509C is configured to be compressed 513 in a predetermined manner. The compression method 513 to be applied may depend on the type of content data items rendered into a corresponding raster canvas. The outcome of the compression 513 of the image content data in the raster canvases is stored in a form of bitmap files, for example, with necessary other information according to previous description. The stored files comprise the image content data to be illustrated in a corresponding image layer in the final layered visual output.

Figure 6:
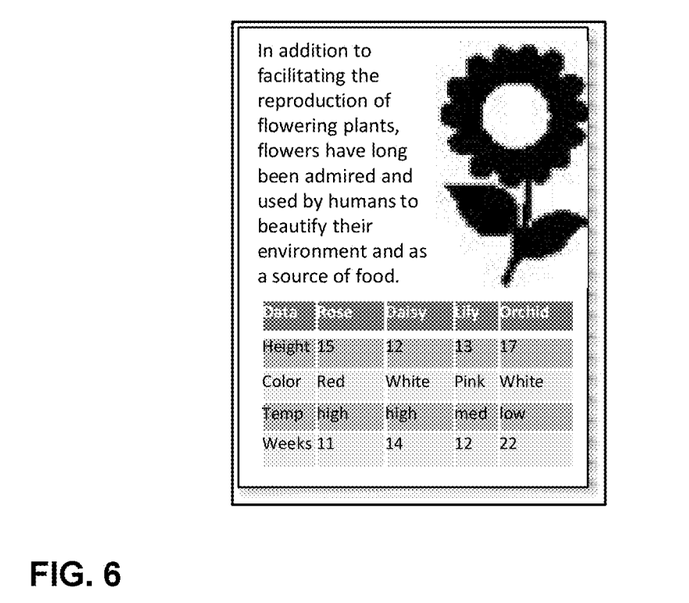
FIG. 6 illustrates an example of an outcome of the method according to the invention.

FIG. 6 illustrates the final visual outcome of the method as illustrated in FIG. 5 in order to bring out the intended visual presentation, which can be achieved with the invention.

Above it is described examples of the method implemented with a computer and the system according to the invention in a case, wherein there is received multiple image content items of different types. However, the example of the invention as e.g. illustrated in FIG. 1, may also be applied in a situation in which one or more image content items are received, wherein the content items are categorized into only one category. This may at least be the case, when all the received content items are the same type. Alternatively or in addition, it may also be the case if image content items of different types may be categorized into one category under predetermined rules. As a result, there may be multiple categories each comprising image content items of more than one type. The image content item or items in the category or categories are then rendered into a raster canvas, which raster canvas represents all the image content data in a category. Next, the image content data in the raster canvas is compressed, wherein the compression method for the raster canvas is selected on a basis of the image content data. The output of the compression step is stored. The method may further comprise a step of outputting the stored image content data of the raster canvas into a display device, a printer and/or a communication channel. Furthermore, the method may also comprise a step of storing the rendered the image content item as a raw data and performing post-processing to such rendered image content data prior to the compression. In the method, in the case of only one image content item, the categorizing may be performed on a basis of analysis of the received image content item or on a basis of detecting an identifier indicating the type of the received image content item, for example. Additionally, some aspects of the method may relate to a positioning of the image content data, wherein the positioning of the image content data is determined by defining the position of the image content data in the raster canvas with respect to a coordinate system. As said, the method as described in this paragraph may also be applied I a situation in which multiple image content items, which are of the same type, are received. A corresponding system implementing the method may be arranged with portions of computer program code, which portions of computer program code, when executed by a processor or processors, cause the system to implement the method. An example of an applicable system is illustrated in FIG. 2.

The examples of the methods according to the invention may also comprise aspects in which only some categories containing image content items are prepared and taken to the final visual output. It is possible to define rules according to which different categories, or even rendered image content data, are taken to the final visual output. For example, it may be a situation that one category comprises only very limited amount of data, i.e. image content items of a certain type or types. It may also be analyzed that the image content items in the category bring only minor, if at all, visual effect into the final visual output. Thus, the manipulation engine may be configured to delete, or ignore, such a category or categories in order to improve the efficiency of the manipulation engine as all the received image content items are not manipulated according to the method steps as described. For example, the rendering and/or compression can be omitted in the manner as described. Any applicable rule may be applied in the selection, which category or categories are taken to the further processing.

The examples of the invention as described herein also relate to non-transitory computer-readable storage mediums storing portions of computer program code implementing, when executed by a computer, any, all or any combination of the method steps as disclosed.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various implementations.

What is claimed is:

1. A computer implemented method for creating visual content to be output in a layered manner, the method comprising:
   a) receiving at least two image content items,
   b) categorizing the received image content items on a basis of a type of the image content items to at least two categories wherein the categorization is configured to take into account at least vector graphics and raster graphics as different types of the image content items,
   c) rendering the image content items in each of the at least two categories into corresponding number of raster canvases, each raster canvas representing image content data in one category, wherein at least two raster canvases are overlapping and wherein the overlapping area in each overlapping raster canvases is set transparent except on areas wherein the raster canvas in question comprises image content data,
   d) compressing the image content data in each of the raster canvases, wherein the compression method for each of the raster canvases is selected on a basis of the image content data in the raster canvas to be compressed so that if a raster canvas comprises transparency information it is compressed with a lossless compression method,
   e) storing the compressed image content data of each of the raster canvases.

2. The computer implemented method as claimed in claim 1, the method further comprising a step of outputting the stored image content data of each of the raster canvases into one of the following: a display device, a printer, a communication channel.

3. The computer implemented method as claimed in claim 1, the method further comprising a step of storing the rendered image content items as a raw data and performing post-processing to such rendered image content data prior to the compression.

4. The computer implemented method as claimed in claim 1, wherein the categorizing is performed on a basis of analyzing the received image content items.

5. The computer implemented method as claimed in claim 1, wherein the categorizing is performed by detecting an identifier indicating the type of the received image content item.

6. The computer implemented method as claimed in claim 1 further comprising a step of determining a position of the image content data in each of the raster canvases with respect to each other when image content data in at least one raster canvas has different physical dimensions than the image content data in at least one other raster canvas.

7. The computer implemented method as claimed in claim 6, wherein the positioning of image content data in the raster canvases with respect to each other is achieved by means of determining at least two reference points in image content data of a raster canvas covering the largest area of the area to be displayed, the at least two reference points are configured to be utilized in positioning image content data of at least one other raster canvas with respect to the image content data of the raster canvas with the reference points.

8. The computer implemented method as claimed in claim 6, wherein the positioning of the image content data of the raster canvases is determined by defining the position of the image content data in each of the raster canvases with respect to a common coordinate system.

9. The computer implemented method as claimed in claim 1, wherein the compression method for the image content data in each of the raster canvases is different.

10. The computer implemented method as claimed in claim 1, wherein the compression method for the image content data in each of the raster canvases is the same.

11. The computer implemented method as claimed in claim 1, wherein the compression method for the image content data in each of the raster canvases is the same with different parameters used within the compression method.

12. The computer implemented method as claimed in claim 1, wherein the image content data in each of the raster canvases comprises an indicator indicating at least one of the following: the image content data of the raster canvases belonging to the same visual output to be displayed, an order of the image content data of the raster canvases with respect to each other in the visual content to be displayed in a layered manner, positional information of the image content data of the raster canvas when displayed.

13. The computer implemented method as claimed in claim 12, wherein the indicator is established in at least one of the following manner: in a file name of a file where compressed image content data from a raster canvas is stored, in a metadata of a file storing compressed image content data of a raster canvas, in a separate file maintaining instructions for displaying the visual content.

14. A system for creating visual content to be output in a layered manner, the system comprising:
one or more processors; and
a memory including computer program code;
the memory and the computer program code configured to, with the processor, cause the system at least to perform:
receive at least two image content items,
categorize the received image content items on a basis of a type of the image content items to at least two categories, wherein the categorization is configured to take into account at least vector graphics and raster graphics as different types of the image content items,
render the image content items in each of the at least two categories into corresponding number of raster canvases, each raster canvas representing image content data in one category, wherein at least two raster canvases are at least partly overlapping and wherein the overlapping area in each overlapping raster canvases is set transparent except on areas wherein the raster canvas in question comprises image content data,
compress the image content data in each of the raster canvases, wherein the compression method for each of the raster canvases is selected on a basis of the image content data in the raster canvas to be compressed, so that if a raster canvas comprises transparency information it is compressed with a lossless compression method, and
store into the memory the compressed image content data of each of the raster canvases.

15. The system as claimed in claim 14, wherein the system is further configured to output the stored image content data of each of the raster canvases into one of the following: a display device, a printer, a communication channel.

16. The system as claimed in claim 14, wherein the system is further configured to store the rendered image content items as a raw data and to perform post-processing to such rendered image content data prior to the compression.

17. The system as claimed in claim 14, wherein the system is configured to categorize the received image content items on a basis of analyzing the received image content items.

18. The system as claimed in claim 14, wherein the system is configured to categorize the received image content items by detecting an identifier indicating the type of the received image content item.

19. The system as claimed in claim 14, wherein the system is configured to determine a position of the image content data in each of the raster canvases with respect to each other when image content data in at least one raster canvas has different physical dimensions than the image content data in at least one other raster canvas.

20. The system as claimed in claim 19, wherein the system is configured to determine at least two reference points in the image content data of a raster canvas covering the largest area of the area to be displayed, the at least two reference points are configured to be utilized in positioning image content data of at least one other raster canvas with respect to the image content data of the raster canvas with the reference points.

21. The system as claimed in claim 19, wherein the system is configured to determine the positions of the image content data of the raster canvases by defining the position of the image content data in each of the raster canvases with respect to a common coordinate system.

22. A computer implemented method for creating visual content to be output, the method comprising:
receiving one or more image content items,
categorizing the received one or more image content items on a basis of a type of the image content items to a category wherein the categorization is configured to take into account at least vector graphics and raster graphics as different types of the image content items,
rendering the one or more image content items in the category into a raster canvas, the raster canvas representing image content data in the category, wherein at least two raster canvases are at least partly overlapping and wherein the overlapping area in each overlapping raster canvases is set transparent except on areas wherein the raster canvas in question comprises image content data,
compressing the image content data in the raster canvas, wherein the compression method for the raster canvas is selected on a basis of the image content data in the raster canvas to be compressed, so that if a raster canvas comprises transparency information it is compressed with a lossless compression method, and
storing the compressed image content data of the raster canvas.

23. The computer implemented method as claimed in claim 22, the method further comprising a step of outputting the stored image content data of the raster canvas into one of the following: a display device, a printer, a communication channel.

24. The computer implemented method as claimed in claim 22, the method further comprises a step of storing the rendered the image content item as a raw data and performing post-processing to such rendered image content data prior to the compression.

25. The computer implemented method as claimed in claim 22, wherein the categorizing is performed on a basis of at least one of the following: analyzing the received image content item, detecting an identifier indicating the type of the received image content item.

26. A system for creating visual content to be output, the system comprising:
one or more processors; and
a memory including computer program code;
the memory and the computer program code configured to, with the processor, cause the system at least to perform:
receive one or more image content items,
categorize the received one or more image content items on a basis of a type of the image content items to a category wherein the categorization is configured to take into account at least vector graphics and raster graphics as different types of the image content items,
render the one or more image content items in the category into a raster canvas, the raster canvas representing image content data in the category, wherein at least two raster canvases are at least partly overlapping and wherein the overlapping area in each overlapping raster canvases is set transparent except on areas wherein the raster canvas in question comprises image content data, compress the image content data in the raster canvas, wherein the compression method for the raster canvas is selected on a basis of the image content data in the raster canvas to be compressed so that if a raster canvas comprises transparency information it is compressed with a lossless compression method, and store the compressed image content data of the raster canvas.

27. The system as claimed in claim 26, wherein the system is further configured to output the stored image content data of the raster canvas into one of the following: a display device, a printer, a communication channel.

28. The system as claimed in claim 26, wherein the system is further configured to store the rendered the image content item as a raw data and to perform post-processing to such rendered image content data prior to the compression.

29. The system as claimed in claim 26, wherein the system is further configured to categorize the image content item on a basis of at least one of the following: analyzing the received image content item, detecting an identifier indicating the type of the received image content item.

30. A non-transitory computer-readable storage medium storing portions of computer program code, wherein the portions of computer program code are computer-executable to implement the method steps as represented in the method of claim 1.

31. A non-transitory computer-readable storage medium storing portions of computer program code, wherein the portions of computer program code are computer-executable to implement the method steps as represented in the method of claim 22.

* * * * *